United States Patent
Demuynck et al.

(10) Patent No.: US 8,275,121 B2
(45) Date of Patent: Sep. 25, 2012

(54) PORTABLE COMMUNICATION DEVICE HAVING A COMBINED SLIDER AND FLIP HINGE ASSEMBLY

(75) Inventors: Randolph C. Demuynck, Wake Forest, NC (US); Matti V. Maatta, Apex, NC (US); Sang B. Kim, Cary, NC (US); Charles C. Hunt, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 278 days.

(21) Appl. No.: 12/048,721

(22) Filed: Mar. 14, 2008

(65) Prior Publication Data

US 2009/0232299 A1 Sep. 17, 2009

(51) Int. Cl.
*H04M 1/00* (2006.01)
*H04M 9/00* (2006.01)

(52) U.S. Cl. .............. 379/433.12; 379/433.13

(58) Field of Classification Search .......... 379/433.12, 379/433.01, 433.11, 433.13; 455/575.1, 455/575.3, 575.4, 550.1, 575.8; 16/239, 16/240, 241, 242, 243, 362, 364
See application file for complete search history.

(56) References Cited

U.S. PATENT DOCUMENTS

| | | | | |
|---|---|---|---|---|
| 7,492,891 B2 * | 2/2009 | Eldon | ............... | 379/433.12 |
| 7,587,225 B2 * | 9/2009 | Kim et al. | ............... | 455/575.1 |
| 7,650,671 B2 * | 1/2010 | Lee | ............... | 16/362 |
| 2006/0270445 A1 | 11/2006 | Miramontes | | |
| 2007/0076861 A1 | 4/2007 | Ju | | |
| 2007/0199177 A1 * | 8/2007 | Roberts | ............... | 16/266 |

FOREIGN PATENT DOCUMENTS

EP  1 811 750  7/2007

OTHER PUBLICATIONS

International Search Report and Written Opinion for International Application No. PCT/US2008/078124 dated Dec. 10, 2008.
International Preliminary Report on Patentability for International Application No. PCT/US2008/078124 dated Jun. 10, 2010.

* cited by examiner

*Primary Examiner* — Davetta W Goins
*Assistant Examiner* — Phylesha Dabney
(74) *Attorney, Agent, or Firm* — Renner, Otto, Boisselle & Sklar, LLP

(57) ABSTRACT

A portable communication device includes a base, an intermediate portion and a top portion that are operatively coupled by a combination hinge assembly. The combination hinge assembly is configured to facilitate sliding motion between the base and the intermediate portion and rotation between the base and the top portion. The base, intermediate portion and top portion may be configured to include respective displays and/or touch input devices to provide a portable communication device with increased display area and/or control area with a smaller footprint often associated with conventional clamshell or slider portable communication devices.

18 Claims, 5 Drawing Sheets

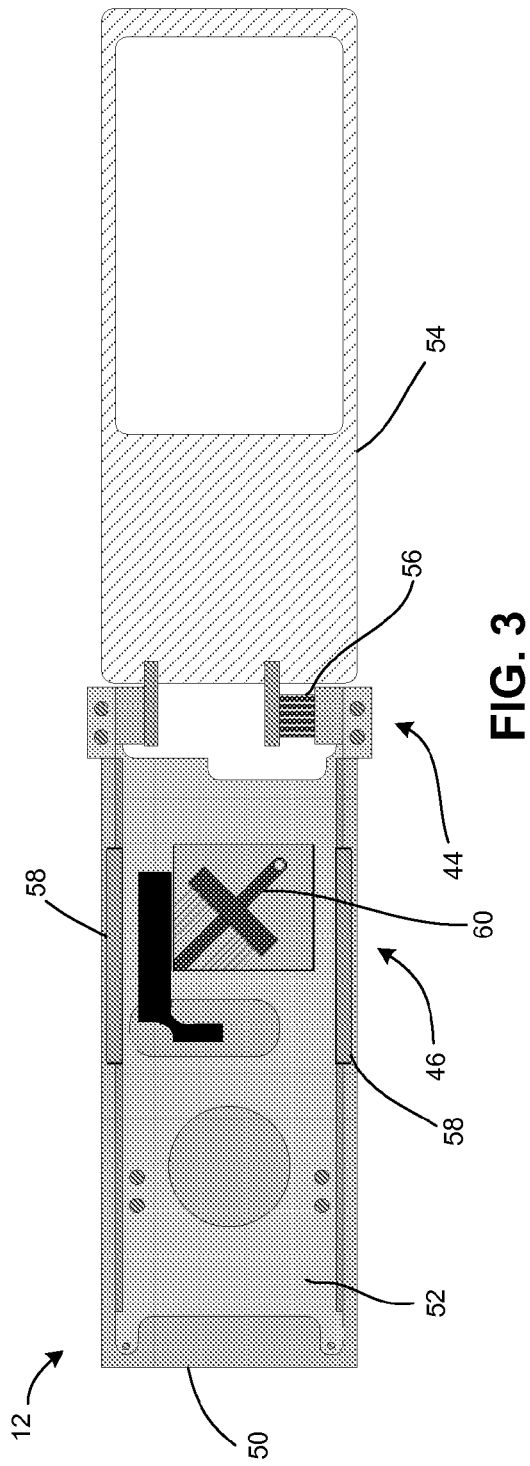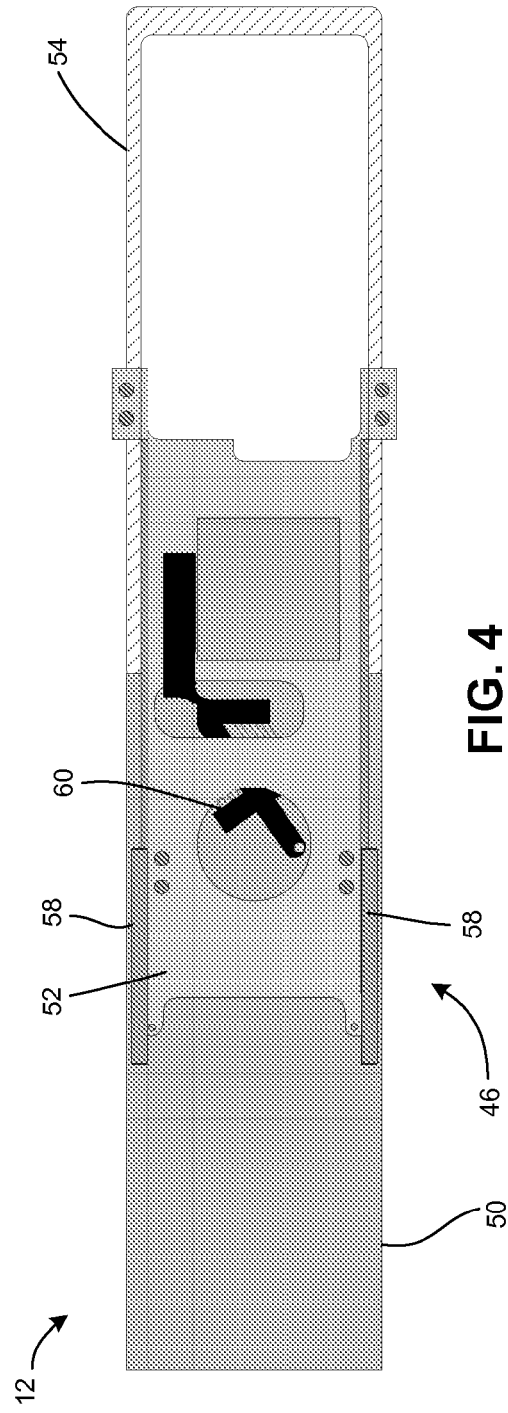

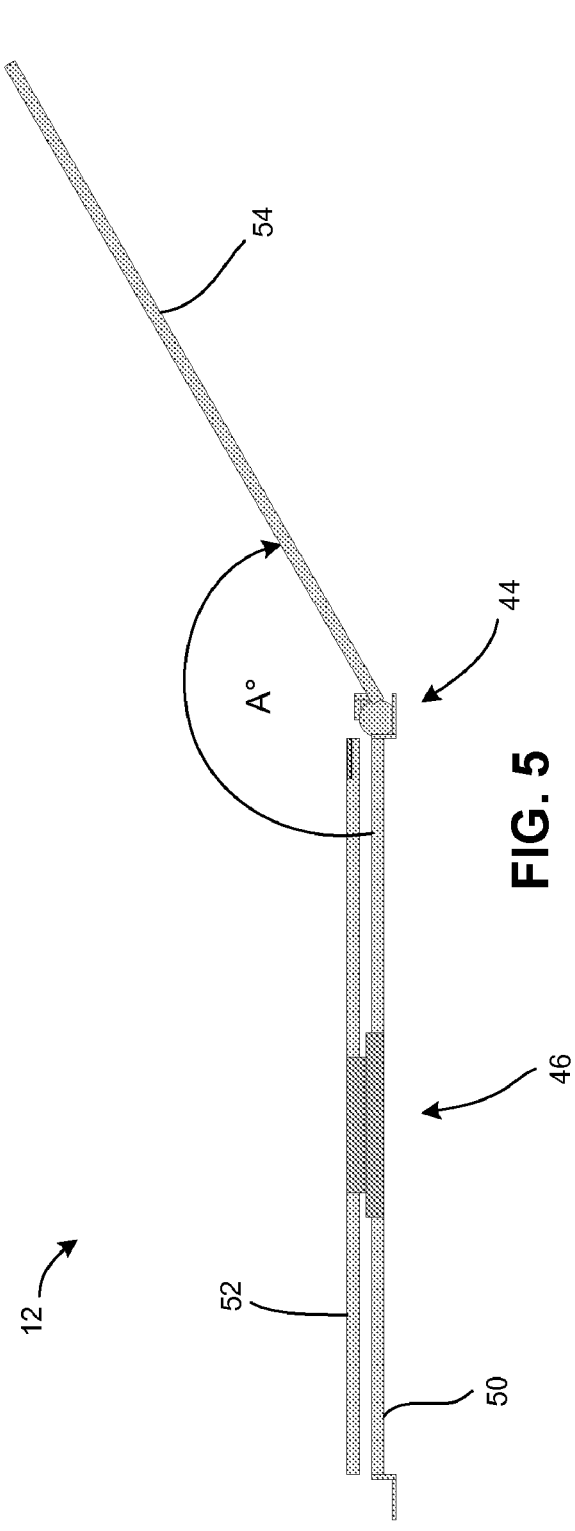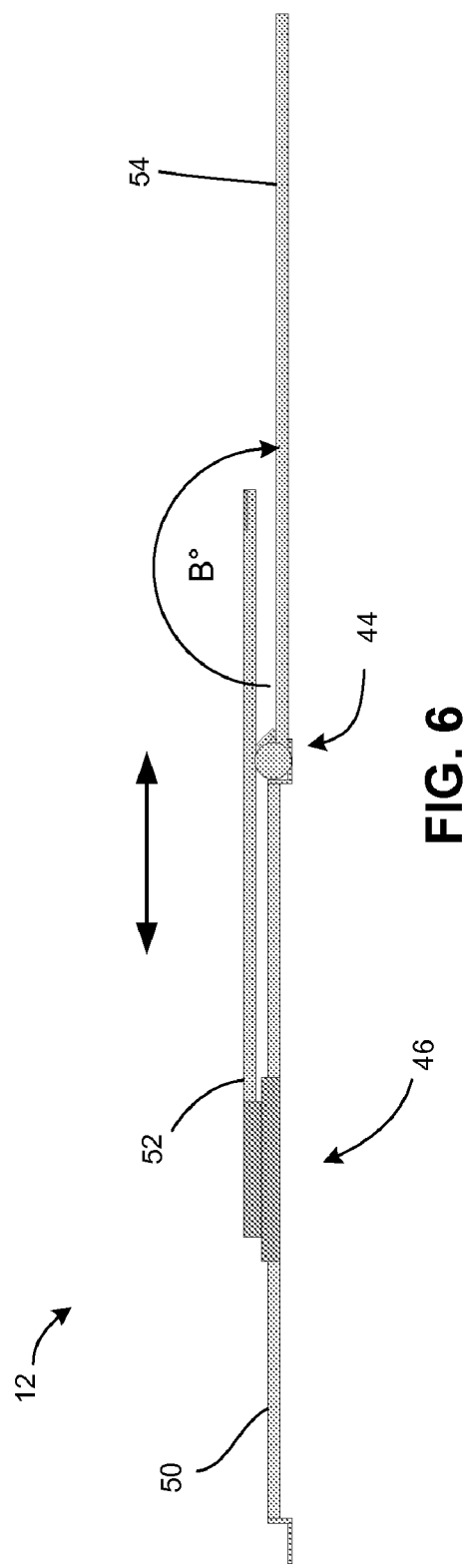

PORTABLE COMMUNICATION DEVICE HAVING A COMBINED SLIDER AND FLIP HINGE ASSEMBLY

TECHNICAL FIELD OF THE INVENTION

The present invention relates generally to portable communication devices, and more particularly, to a portable communication device having a combined slider and flip hinge assembly.

DESCRIPTION OF RELATED ART

Portable communication devices, and in particular mobile telephones, are used for a wide variety of applications. For example, mobile phones are used not only for phone conversations and for sending/receiving messages, but also for browsing the internet, viewing multimedia content, such as movies or music, and for playing games, etc.

In general, the display screen on a mobile phone is limited by the size of the phone. As mobile phones are reduced in size, the surface area available for the display screen, functional keys and a keypad is reduced. In order to maximize the size of the display screen, some mobile devices are designed with a base and a display that is movable relative to the base. In these mobile phones, the keypad often is incorporated into the base and exposed only after opening/moving the display. Known mobile devices of this variety include clamshell devices, in which the display is connected to the base via a conventional rotational hinge, and slider devices, in which the display is slidable with respect to the base, for example, on a rail or a track.

SUMMARY

To enhance functionality and versatility, a portable communication device is provided with a combination slider and flip hinge assembly. The combination hinge assembly is configured to couple a base, an intermediate portion and a top portion such that the top portion can rotate relative to the base and the intermediate portion can slide relative to the base and the top portion. The base, intermediate portion and/or top portion may be configured to include touch-input devices and/or display devices. The provision of a combination slider and flip hinge assembly allows for a mobile phone that has the look and feel of a larger phone with more display area and/or control area with a smaller footprint.

One aspect of the disclosed technology relates to a portable communication device that includes a base; an intermediate portion; and a top portion; wherein the base, the intermediate portion and the top portion are operatively coupled by a combination hinge assembly, wherein the combination hinge assembly is configured to facilitate rotational movement between the base and the top portion and sliding movement between the base and the intermediate portion.

According to another aspect, the combination hinge assembly includes a flip hinge portion and a sliding hinge portion.

According to another aspect, the combination hinge assembly comprises a base hinge plate, an intermediate hinge plate, and a top hinge plate; wherein the top hinge plate is rotationally coupled to the base hinge plate; and wherein the intermediate hinge plate is slidingly coupled to the base hinge plate.

According to another aspect, the top hinge plate is coupled to the base hinge plate by a spring hinge.

According to another aspect, the intermediate hinge plate is coupled to the base hinge plate by a rail assembly.

According to another aspect, the combination hinge assembly is configured to facilitate rotation of the top portion of about 180 degrees relative to the base portion.

According to another aspect, the combination hinge assembly is configured to facilitate sliding motion of the intermediate portion relative to the base portion when the top portion is rotated by about 180 degrees relative to the base portion.

According to another aspect, the portable communication device includes an electromechanical switch that is activated upon sliding motion of the intermediate portion relative to the base portion.

According to another aspect, the electromechanical switch is configured to activate a change in the portable communication device from a first mode to a multimedia mode.

According to another aspect, the portable communication device is configured to operate in a portrait mode when the intermediate portion is in a first position, and the portable communication device is configured to operate in a landscape mode when the intermediate portion is slid into a second position.

According to another aspect, the combination hinge assembly is configured provide at least two rotational stop points between the top portion and the base.

According to another aspect, a first rotational stop point is at an angle of about 125 degrees to about 145 degrees between the base and the top portion.

According to another aspect, a second rotational stop point is at an angle of about 180 degrees between the base and the top portion.

According to another aspect, the base, the intermediate portion and the top portion each comprise a touch-sensitive input device.

According to another aspect, each touch-sensitive input device is a touch-sensitive display.

According to another aspect, the portable communication device is a mobile telephone.

Another aspect of the disclosed technology relates to a combination hinge assembly for use in connection with a portable communication device. The combination hinge assembly includes a base member, an intermediate member and a top member, wherein the top member is coupled to the base member by a flip hinge, and wherein the intermediate member is coupled to the base member by a slider hinge.

According to another aspect, the combination hinge assembly is configured to facilitate rotation of the top member of about 180 degrees relative to the base member, and to facilitate sliding motion of the intermediate member relative to the base member when the top member is rotated by about 180 degrees relative to the base member.

According to another aspect, the flip hinge is configured to provide at least two rotational stop points between the top member and the base member, wherein a first rotational stop point is at an angle of about 125 degrees to about 145 degrees between the base and the top portion, and a second rotational stop point is at an angle of about 180 degrees between the base and the top portion.

Another aspect of the disclosed technology relates to a portable communication device that includes a base having a first touch-sensitive input device; a top portion having a second touch-sensitive input device, the top portion being coupled to the base by a first hinge assembly, the first hinge assembly being configured to facilitate rotational movement of the top portion relative to the base; and an intermediate portion having a third touch-sensitive input device, the intermediate portion being coupled to the base by a second hinge assembly, the second hinge assembly being configured to facilitate sliding motion of the intermediate portion relative to the base.

According to another aspect, when the top portion is rotated by about 180 degrees relative to the base, and the intermediate portion is slid relative to the base, the first, second and third touch-sensitive input devices are exposed.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 3 is a top view of a combination hinge assembly in an open position;

FIG. 4 is a top view of a combination hinge assembly in another open position configuration;

FIG. 5 is a side view of a combination hinge assembly in a partially open position;

FIG. 6 is a side view of a combination hinge assembly in an open position;

DETAILED DESCRIPTION OF EMBODIMENTS

Figure 1:
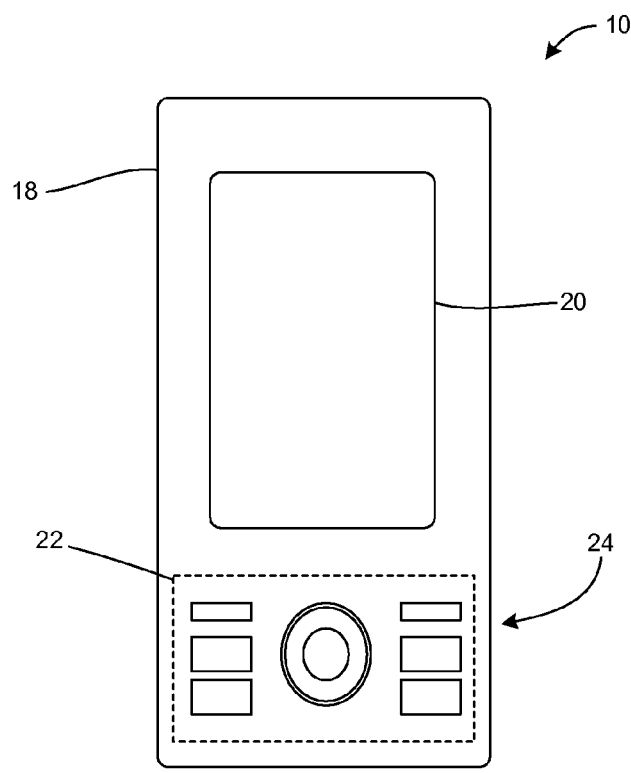
FIG. 1 is a top view of an exemplary portable communication device, such as a mobile telephone in a closed position.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As referred to herein, the term "portable communication device" includes portable radio communication equipment. The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like.

In the context of the illustrated embodiments, the portable communication device is primarily referred to as a mobile telephone or a mobile phone. The description and illustrations of the mobile telephone, however, are intended to serve as a non-limiting exemplary environment for the inventive concepts described herein, and it will be appreciated that the invention is not intended to be limited to a mobile telephone, but rather can be any type of electronic equipment.

Mobile phone designers struggle with phone size over function and convenience. In one respect, mobile phones having smaller footprints are desirable for their portability. Examples of such phones include phones having a clamshell form factor in which a top portion of the phone rotates between open and closed positions relative to the base, which typically includes a keypad. Another example of a phone having a smaller form factor is a "slider phone." Mobile phones with slider hinges typically include a keypad on the base that is exposed by sliding the display vertically and/or horizontally relatively to the base. Functional keys, typically located on the same surface as the display, are used for navigating menus and for initiating various functions on the device. Due to the location of the functional keys, the surface area available for the display screen is reduced, thus requiring the display screen to also be reduced in size. Furthermore, when the display is slid open, the functional keys are slid away from the user's hands, making them generally difficult to reach and/or inconvenient to use.

The smaller footprint associated with slider phones and clamshell phones often limits the phone's utility for multimedia applications, such as text messaging, surfing the web and/or gaming operations. Larger phones (e.g., phones having larger display areas and/or control areas) provide better functionality for multimedia applications, but are more cumbersome for user's to carry around.

The present disclosure recognizes shortcomings with conventional portable communication devices, including slider mobile phones and clamshell phones, as well as larger phones, and provides a portable communication device (e.g., a mobile phone) having a combination slider and flip hinge assembly. The combination hinge assembly may be configured to couple a base, an intermediate portion and a top portion, each of which may be configured to include displays and/or touch-sensitive control areas, thereby providing a mobile phone that has the look and feel of a larger phone with more display area and/or control area with the smaller footprint often associated with slider and/or clamshell phones.

Figure 2:
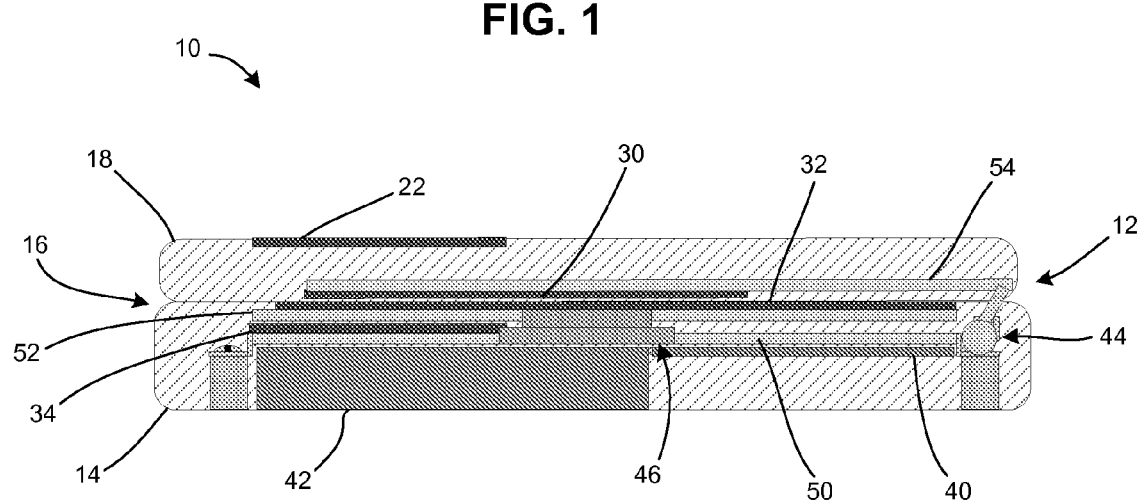
FIG. 2 is a sectional view of the mobile telephone of FIG. 1 in a closed position.

Referring initially to FIG. 1 and FIG. 2, an exemplary embodiment of a portable communication device 10 (e.g., a mobile phone, mobile terminal or the like) is shown as it would appear when operating in what is conventionally referred to as a "standby" mode. As is described more fully below, the mobile phone 10 includes a combination hinge assembly 12 (also referred to as a combination slider and flip hinge assembly or simply as a hinge assembly). The combination hinge assembly 12 is coupled to and provides or otherwise facilitates relative movement between a base 14, an intermediate portion 16 and a top portion 18. In the illustrated exemplary embodiment, the top portion 18 includes an outer display 20, for example, a display that may be viewed when the phone is in a closed position and/or in a standby mode. In addition, the top portion 18 may include or otherwise define a touch-sensitive input area 22 (e.g., a touch input display or other touch-input control area). In the illustrated exemplary embodiment, the touch-sensitive area 22 is configured to provide functional and/or navigational keys 24.

The functional and/or navigational keys 24 may provide for a variety of user input operations. For example, the functional keys 24 typically include special function keys, such as a "call send" key for initiating or answering a call, and a "call end" key for ending or "hanging up" a call. Special function keys also may include menu navigation keys, for example, for navigating through a menu displayed on the display(s) to select different telephone functions, profiles, settings, etc., as is conventional. Other navigational keys or controls may include directional keys (e.g., up, down, left, and right) to highlight different links, or icons, or to navigate text or other documents, etc. The navigational controls 24 also may be in the form of a roller ball or navigational ball, as will be appreciated. Other keys associated with the mobile telephone may include a volume key, an audio mute key, an on/off power key, a web browser launch key, a camera key and the like. The navigational keys may be embodied as "hard keys" or "soft keys" implemented on a touch-sensitive input device.

The outer display 20 (e.g., a touch screen) is configured to display information to a user, such as, operating state, time, telephone numbers, contact information, menus, etc. The user also can view and utilize various features and functions related to the various operating states of the mobile phone 10 on the display 20. The display 20 also may be used to visually display content received by the mobile telephone 10 and/or retrieved from a memory of the mobile telephone 10. For example, the user can watch movies, play video games, and browse the internet, etc., on the screen. Such audio/video materials may be stored on memory within the phone or accessed from remote servers, as will be appreciated.

As shown in FIG. 2, and described more fully below, the mobile phone includes a base 14 and a top portion 18 that each are coupled to portions of the combination hinge assembly 12 such that the top portion 18 may be rotated relative to the base portion 14 (e.g., such that the top portion may be opened or closed). In addition, the base 14 and the intermediate portion 16 each are coupled to the combination hinge assembly 12 such that the intermediate portion 16 may be slid or otherwise laterally translated relative to the base 12 when the top portion is rotated to a completely open position (e.g., a position where the top portion is at an angle of about 180 degrees relative to the base).

In the exemplary embodiment illustrated in FIG. 2, the top portion includes a first touch-sensitive input device 22 (e.g., an outer touch-sensitive input device) and a second touch sensitive input device 30 (e.g., an inner touch-sensitive input device such as a touch-sensitive display or touch screen). The intermediate portion 16 includes a touch-sensitive input device 32 (e.g., a touch-sensitive display or touch screen). Alternatively, device 32 may simply be a conventional display. The base 14 includes a touch-sensitive input device 34 (e.g., a touch-sensitive display or touch screen).

In one embodiment, touch-sensitive input devices 30, 32 and 34 each are touch-sensitive displays or touch screens. Exemplary touch screens include thin film transistor (TFT) LCD screens. It will be appreciated that different screens, such as larger or smaller screens, or other thin screen technology may be utilized without departing from the scope of the present invention.

If the mobile phone includes touch screens, the screens may be navigated by using a stylus or by otherwise touching the surface of the screen to select various functions and/or to input information or data into the phone. As is described more fully below, keys or key-like functionality also may be embodied as a touch screen on the display screen, and it will be appreciated that in such embodiments, the functional and/or navigational keys may be incorporated into the touch screen to incorporate a larger screen on the display.

In the illustrated embodiment, the base 14 also house a main printed circuit board assembly (PCBA) 40 that includes the electronics, memory, and circuitry, etc., necessary for operating the mobile phone 10, including conventional call circuitry that enables the mobile telephone 10 to establish a call or otherwise exchange signals other devices, such as other mobile devices, internet web servers, media servers, or the like. The call circuitry also may be responsible for transmitting and receiving text messages, emails, or text documents. Additionally, the mobile phone 10 may include circuitry for browsing the internet, playing or viewing audio/visual materials, such as picture, music or video files and for gaming operations. Circuitry that controls the touch-sensitive input devices 30, 32 and 34 also is included. In one embodiment, the display control circuitry dynamically adapts the displayed output of the touch-sensitive input devices 30, 32 and 34 depending upon the mode in which the phone is operating. As is discussed more fully below, the mobile phone 10 can be configured to operate in both portrait and landscape orientations depending upon the relative positions of the top portion 14 and the intermediate portion 16.

In the illustrated embodiment, the main PCBA 40 is housed within the base 14 and electrically connected to the battery 42, which provides the necessary power for operating the mobile phone 10. A connector establishes an electrical connection between the battery 42 and the adjacent PCBA 40. The PCBA 40 may be connected to the various touch-sensitive input devices and/or displays with suitable flex circuitry. Alternatively, the PCBA may be connected to auxiliary PCBAs associated with the top and intermediate portions by suitable flex circuitry.

Turning now to FIGS. 3-6 and with continued reference to FIG. 2, an exemplary embodiment of the combination hinge assembly 12 is provided. The combination hinge assembly 12 includes a flip hinge portion 44 (e.g., a spring hinge) and a sliding hinge portion 46 (e.g., cooperative rail assemblies). In accordance with one embodiment, the combination hinge assembly 12 includes a base hinge member 50 (also referred to as a base hinge plate or simply a base plate), an intermediate hinge member 52 (also referred to as an intermediate hinge plate or simply an intermediate plate) and a top hinge member 54 (also referred to as a top hinge plate or simply a top plate). It will be appreciated that the base hinge member, the intermediate hinge member and the top hinge member are not intended to be limited to a particular geometry (e.g., not intended to be limited to a plate-type geometry). The combination hinge assembly (and the various portions of the hinge assembly) may be made of any suitable material, including, but not limited to, steel or another metal or plastic. In one embodiment, the base plate, the intermediate plate and the top plate may be integrally formed with the associated base, intermediate portion and top portion.

Figure 7:
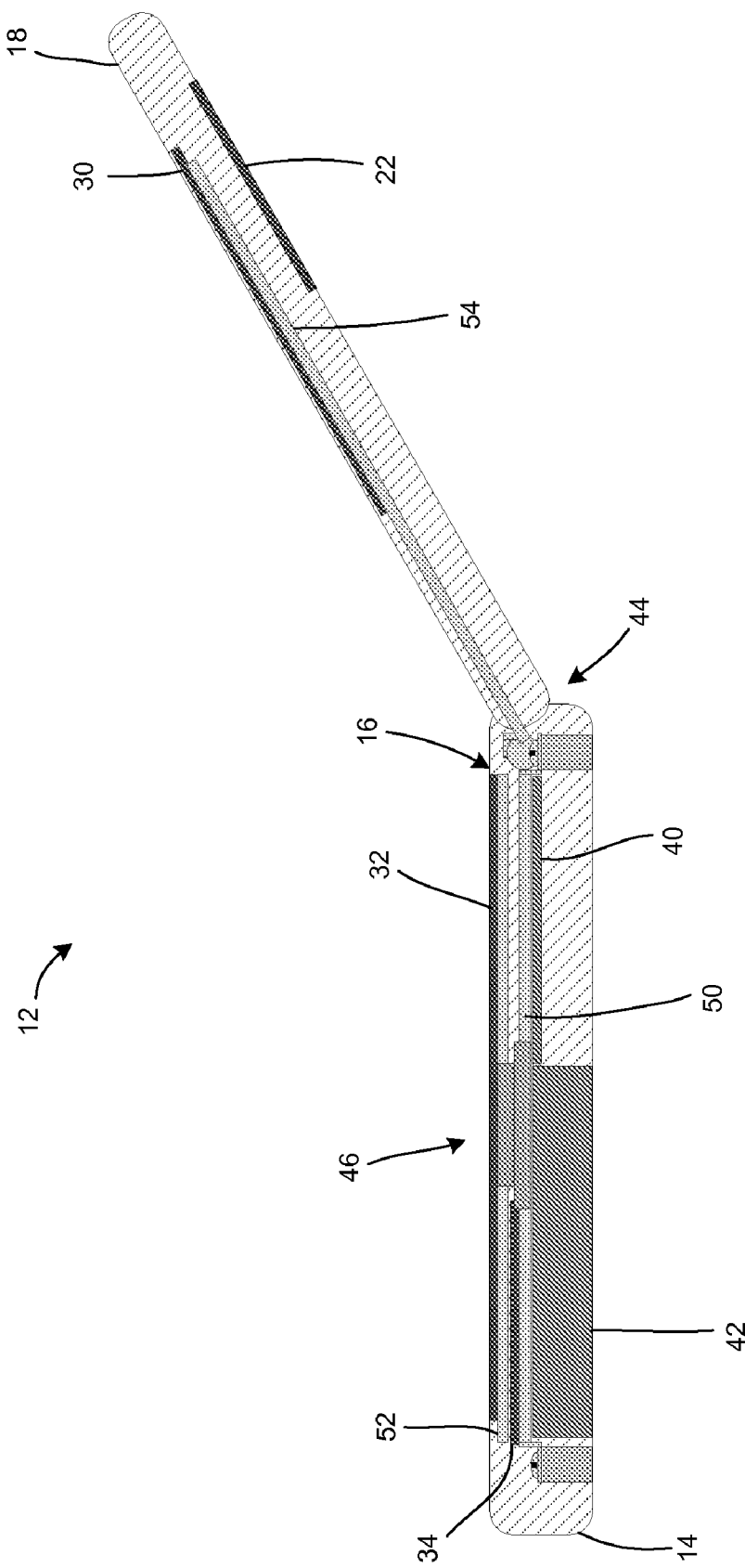
FIG. 7 is a sectional view of the mobile telephone of FIG. 2 in a partially open position.
Figure 8:
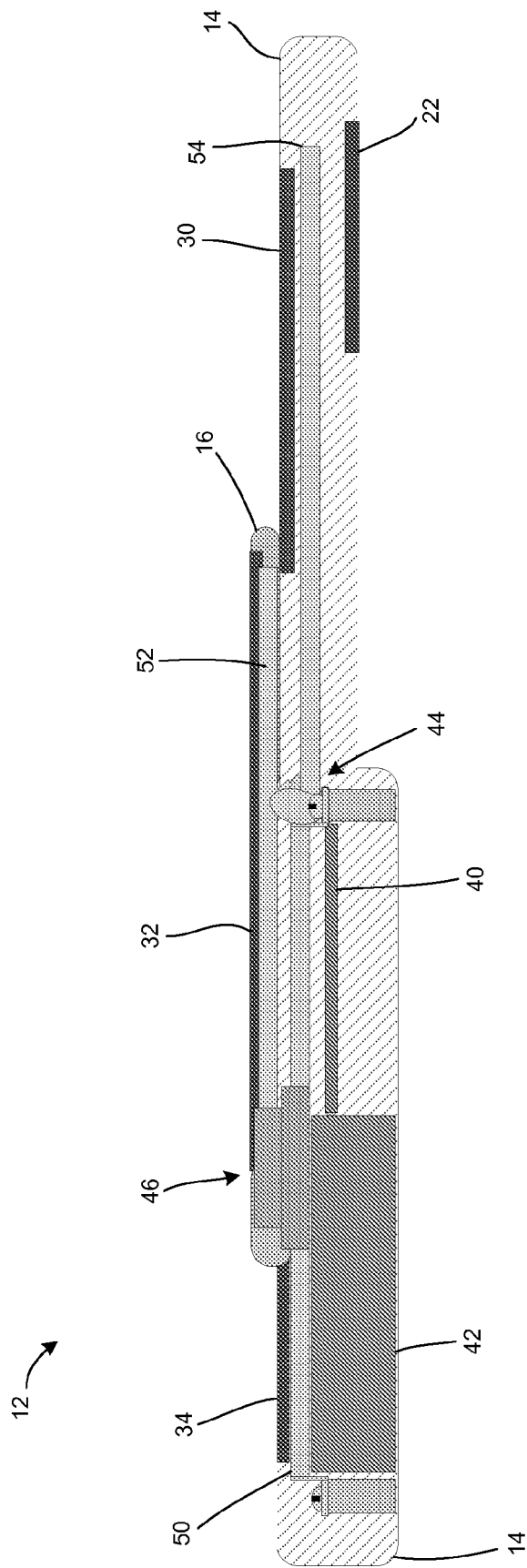
FIG. 8 is a sectional view of the mobile telephone of FIG. 2 in an open position.

The combination hinge assembly 12 is configured such that the top hinge plate may be rotated relative to the base plate, for example, by way of a flip hinge or spring hinge 56 that couples the base hinge plate 50 and the top hinge plate 54 and allows rotational movement of the top hinge plate 54 relative to the base hinge plate 50. In the illustrated exemplary embodiment, the base hinge plate 50 and the intermediate hinge plate 52 are coupled by a sliding hinge assembly, for example, by cooperative rail assemblies 58 that allow sliding motion or lateral translation of the intermediate plate relative to the base plate. As is described more fully below, the combination hinge assembly 12 including the base plate 50, intermediate plate 52 and top plate 54 is configured to couple the base 14, the intermediate portion 16 and the top portion 18 such that the top portion 18 may be rotated relative to the base 14 from a closed position (shown in FIG. 2) into an open position (as shown in FIG. 7 and FIG. 8). Once the top portion 18 has been rotated into a fully open position or configuration (as shown in FIG. 6 and FIG. 8), the intermediate portion 16 may be slid or otherwise translated relative to the base and the top portion (e.g., along the direction of the arrows in FIG. 6). The slider hinge may be incorporated within the housings of the base and intermediate portion and may include a slider mechanism that is slidably engaged to a slider track such that the slider hinge is not readily viewable by a user of the phone. The sliding hinge portion 46 may include a spring or other resilient member 60 that requires an initial force before the intermediate portion slides relative to the base.

As is described more fully below, these different configurations achieved by relative rotational and or translation motion of the base, intermediate portion and top portion allow for a phone that may operate in a traditional call mode (e.g., in a portrait orientation) and in a multimedia mode (e.g., in a landscape orientation).

In a preferred embodiment, the flip hinge portion 44 of the combination hinge assembly is configured as a spring hinge 56 that includes or otherwise provides at least two stop positions, that is, at least two stops in the rotational motion of the top portion relative to the base portion. In one embodiment, one of the stop positions will be at an angle A° of about 135 degrees (plus or minus ten or fifteen degrees) between the base and top portion (as shown in FIG. 5). This configuration will allow for normal voice communication operation of the portable communication device. The flip hinge portion of the combination hinge assembly is also configured to provide at least a second stop position, for example, at an angle B° of about 180 degrees between the base and the top portion (as shown in FIG. 6). Once the top portion has been rotated to a position of about 180 degrees relative to the base, the intermediate portion may be slid or otherwise translated (along the direction of the arrow in FIG. 6) relative to the base and the top portion, for example, by the sliding hinge portion of the combination hinge assembly (as shown in FIG. 6).

FIG. 7 and FIG. 8 show an exemplary combination hinge mobile phone in a partially opened position (FIG. 7) and a fully opened position (FIG. 8). As is discussed above, the flip hinge portion of the combination hinge assembly may be configured to include at least a first stop position at, for example, about 135 degrees (shown in FIG. 7). Further, the flip hinge portion of the combination hinge assembly may be configured to include at least a second stop portion at, for example, about 180 degrees between the base and top portion (shown in FIG. 8). When the mobile phone is in the second stop position, the intermediate portion is free to move across the center of the phone across the flip hinge portion.

It will be appreciated that multiple use cases (and associated phone configurations) may be achieved by the design described above. In one embodiment, the phone includes three distinct displays 30, 32 and 34 on the "inside" of the mobile phone, each with a touch-sensitive input portion so that they could be used or otherwise configured as input devices. When in a normal flip open mode (FIG. 7) display 32 within intermediate portion 16 may be configured to function as a typical keypad (e.g., alphanumeric keypad and/or QWERTY keypad) and display 34 within base 14 is hidden. When the mobile phone is transitioned to the web/multimedia mode (FIG. 8) (e.g., by opening the top portion and sliding the intermediate portion relative to the base) all three touch-sensitive input surfaces 30, 32 and 34 are exposed, and display 32 may switch to function as the main display, while displays 30 and 32 are configured to operate as input devices. In one embodiment, the transition of display 32 from keypad mode to main display mode may be triggered by an electromechanical switch that is activated upon sliding movement of intermediate portion 16 to reveal touch-sensitive input device 34. In this embodiment, the user may hold the mobile device with both hands in a landscape mode as the user navigates/operates the device with his/her thumbs. Of course other use cases and configurations may be realized without departing from the scope of the present invention.

The provision of a mobile phone having a base, an intermediate portion and a top portion coupled by a combination hinge assembly provides a mobile phone having enhanced functionality and versatility. For example, the provision of a combination slider and flip hinge assembly provides the conveniently-sized form factor or footprint of a phone along with the enhanced control space/features and/or display space/features found in phones having larger form factors. Stated differently, the above-described mobile phone provides the look and feel of a larger phone with more display area and/or control area with the smaller footprint often associated with clamshell and/or slider phones.

In addition, the provision of a combination hinge assembly that couples a base, intermediate portion and top portion (with the base, intermediate portion and top portion having touch-input devices) provides for a versatile mobile phone that may be operated in a first mode (e.g., in a portrait orientation) for calling and simple messaging operations, and a second mode (e.g., in a landscape orientation) for web surfing, gaming and/or other multimedia operations. For example, in one embodiment, the top portion may be opened and the intermediate portion may be slid to reveal touch-sensitive input device (and possibly triggering a transition to a multimedia mode), whereby touch-sensitive device 32 functions as the main display and touch-sensitive devices 30 and 34 are configured as touch-sensitive control interfaces. In this configuration, the phone can operate in a "balanced mode" where a user can hold the device with both hands in a landscape mode having control areas on both sides of a relatively-centered main display. Other modes of operation may be realized without departing from the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
a base;
an intermediate portion; and
a top portion;
wherein the base, the intermediate portion and the top portion are operatively coupled by a combination hinge assembly, wherein the combination hinge assembly is configured to facilitate rotational movement between the base and the top portion and sliding movement between the base and the intermediate portion; and
wherein the combination hinge assembly comprises a base hinge plate, an intermediate hinge plate, and a top hinge plate;
wherein the top hinge plate is rotationally coupled to the base hinge plate; and
wherein the intermediate hinge plate is slidingly coupled to the base hinge plate; and
wherein the combination hinge assembly is configured to facilitate rotation between the top portion and the base portion in an angular range of between 0 degrees and about 180 degrees.

2. The portable communication device of claim 1, wherein the combination hinge assembly includes a flip hinge portion and a sliding hinge portion.

3. The portable communication device of claim 1, wherein the intermediate hinge plate is coupled to the base hinge plate by a rail assembly.

4. The portable communication device of claim 1, wherein the combination hinge assembly is configured to facilitate sliding motion of the intermediate portion relative to the base portion when the top portion is rotated by about 180 degrees relative to the base portion.

5. The portable communication device of claim 4, further comprising an electromechanical switch that is activated upon sliding motion of the intermediate portion relative to the base portion.

6. The portable communication device of claim 5, wherein the electromechanical switch is configured to activate a change in the portable communication device from a first mode to a multimedia mode.

7. The portable communication device of claim 5, wherein the portable communication device is configured to operate in a portrait mode when the intermediate portion is in a first position, and the portable communication device is configured to operate in a landscape mode when the intermediate portion is slid into a second position.

8. The portable communication device of claim 1, wherein the combination hinge assembly is configured provide at least two rotational stop points between the top portion and the base.

9. The portable communication device of claim 8, wherein a first rotational stop point is at an angle of about 125 degrees to about 145 degrees between the base and the top portion.

10. The portable communication device of claim 9, wherein a second rotational stop point is at an angle of about 180 degrees between the base and the top portion.

11. The portable communication device of claim 1, wherein the base, the intermediate portion and the top portion each comprise a touch-sensitive input device.

12. The portable communication device of claim 11, wherein each touch-sensitive input device is a touch-sensitive display.

13. The portable communication device of claim 1, wherein the portable communication device is a mobile telephone.

14. A portable communication device comprising:
a base;
an intermediate portion; and
a top portion;
wherein the base, the intermediate portion and the top portion are operatively coupled by a combination hinge assembly, wherein the combination hinge assembly is configured to facilitate rotational movement between the base and the top portion and sliding movement between the base and the intermediate portion; and
wherein the combination hinge assembly comprises a base hinge plate, an intermediate hinge plate, and a top hinge plate;
wherein the top hinge plate is rotationally coupled to the base hinge plate by a spring hinge; and
wherein the intermediate hinge plate is slidingly coupled to the base hinge plate; and
wherein the combination hinge assembly is configured to facilitate rotation of the top portion in an angular range of between 0 degrees and about 180 degrees relative to the base portion.

15. A combination hinge assembly for use in connection with a portable communication device, the combination hinge assembly comprising:
a base hinge member, an intermediate hinge member and a top hinge member, wherein the top hinge member is rotationally coupled to the base hinge member by a flip hinge, and wherein the intermediate hinge member is slidingly coupled to the base hinge member by a slider hinge;
wherein the combination hinge assembly is configured to facilitate rotation between the top hinge member and the base hinge member in an angular range of between 0 degrees and about 180 degrees, and to facilitate sliding motion of the intermediate hinge member relative to the base hinge member when the top hinge member is rotated by about 180 degrees relative to the base hinge member.

16. The combination hinge assembly of claim 15, wherein the flip hinge is configured to provide at least two rotational stop points between the top hinge member and the base hinge member, wherein a first rotational stop point is at an angle of about 125 degrees to about 145 degrees between the base hinge member and the top hinge member, and a second rotational stop point is at an angle of about 180 degrees between the base hinge member and the top hinge member.

17. A portable communication device comprising:
a base having a first touch-sensitive input device;
a top portion having a second touch-sensitive input device, the top portion being coupled to the base by a first hinge assembly, the first hinge assembly being configured to facilitate rotational movement of the top portion relative to the base; and
an intermediate portion having a third touch-sensitive input device, the intermediate portion being coupled to the base by a second hinge assembly, the second hinge assembly being configured to facilitate sliding motion of the intermediate portion relative to the base.

18. The portable communication device of claim 17, wherein when the top portion is rotated by about 180 degrees relative to the base, and the intermediate portion is slid relative to the base, the first, second and third touch-sensitive input devices are exposed.

* * * * *